United States Patent [19]

Kotani et al.

[11] Patent Number: 4,797,748
[45] Date of Patent: Jan. 10, 1989

[54] APPARATUS FOR SETTING TIME INFORMATION IN FACSIMILE SYSTEM

[75] Inventors: Matahira Kotani, Nara; Motohiko Hayashi, Yamatokoriyama; Yoshikatsu Ooi, Habikino, all of Japan

[73] Assignee: Sharp Kabushiki Kaisha, Osaka, Japan

[21] Appl. No.: 921,148

[22] Filed: Oct. 21, 1986

[30] Foreign Application Priority Data

Oct. 21, 1985 [JP]  Japan .................................. 60-235948

[51] Int. Cl.$^4$ ............................................. H04N 1/32
[52] U.S. Cl. ....................................... 358/257; 358/263
[58] Field of Search ............... 358/256, 257, 263, 285, 358/286; 379/100

[56] References Cited

U.S. PATENT DOCUMENTS

| | | | |
|---|---|---|---|
| 4,086,443 | 4/1978 | Gorham | 358/257 |
| 4,113,993 | 9/1978 | Heckman | 358/257 |
| 4,352,012 | 9/1982 | Verderber | 358/257 |
| 4,432,020 | 2/1984 | Onose | 358/257 |
| 4,613,907 | 9/1986 | Yoshimoto | 358/257 |

Primary Examiner—Tommy P. Chin
Attorney, Agent, or Firm—Birch, Stewart, Kolasch & Birch

[57] ABSTRACT

A facsimile equipment for reading time information necessary for transmission, reception and control which is entered in the form of time marks according to a predetermined format, by a reading unit of the facsimile equipment, and which sets the time by feeding the read time information to a clock device.

6 Claims, 4 Drawing Sheets

APPARATUS FOR SETTING TIME INFORMATION IN FACSIMILE SYSTEM

BACKGROUND OF THE INVENTION

1. Field of Invention

This invention relates to facsimile equipment for recording time information such as the year, month, date, day of the week, and time, onto receiving paper, and more particularly to facsimile equipment for obtaining this time information by reading time marks entered on a mark sheet.

2. Description of the Prior Art

In conventional facsimile equipment, for facilitating the filing and controlling of received documents when reproducing written information on receiving paper at the receiving side, it is required to reproduce, additionally, the transmission time or reception time, in addition to sender identification information such as the name of the sender and telephone number, which are not mentioned on the original document.

In the conventional facsimile equipment, the time information is delivered by using a clock device, but the time information of this clock device often deviated due to power failure or other problems, and the time had to be adjusted by means of, for example, numeric keys.

In such time adjusting method, however, numeric keys which are not used frequently must be provided, and it is difficult to simplify the layout, control and system configuration.

SUMMARY OF THE INVENTION

This invention is developed with a view toward overcoming the disadvantages of the prior art, and it is hence a primary object thereof to provide a facsimile equipment capable of adjusting the kept time by feeding accurate time information data to a clock device therein.

To achieve this object, this invention obtains the time information input to the clock device by reading a time mark written on a mark sheet. With the method of time adjusting in a facsimile equipment possessing a clock device of this invention, since the time is adjusted by reading a time mark sheet, complicated key operation is not needed, and the number of required keys may be reduced.

DESCRIPTION OF THE PREFERRED EMBODIMENT

Figure 1:
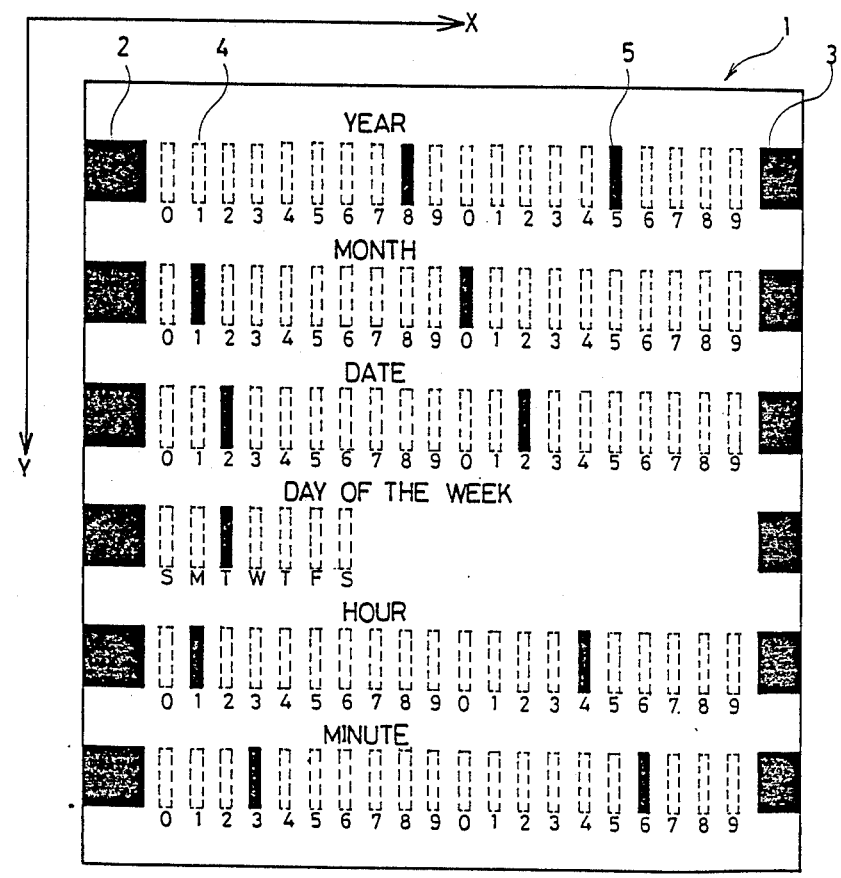
FIG. 1 is a diagram representing the format of a mark sheet according to this invention.

Various methods have been proposed relating to a mark reading method by an image sensor. An example is described herein. FIG. 1 shows a time mark sheet 1 according to this invention, on which a start mark 2, end mark 3, and time mark entry column 4 are preliminarily written, and these marks and entry column are divided into information groups of year, month, date, day of the week, hour, and minute. However, since the time mark entry column 4, and characters of the year, month, date, day of the week, hour, minute, and numerals 0 to 9 are written in drop-out color, they are not read as facsimile information if read and scanned by a mark code reader which is mentioned below.

A time mark 5 is entered according to the format as described above.

FIG. 1 shows marking of the time information of 85 (1985), 10 (October), 22 (the 22nd day), Tuesday, 14 (hours), 36 (minutes). When this mark sheet is inserted into the facsimile equipment, the mark information is read while repeating main scanning (the arrow X direction) and subscanning (the arrow Y direction) by means of a reader which will be described later. According to the signals read by the reader, the facsimile equipment automatically determines the time information, which is supplied into the clock device.

Figure 2:
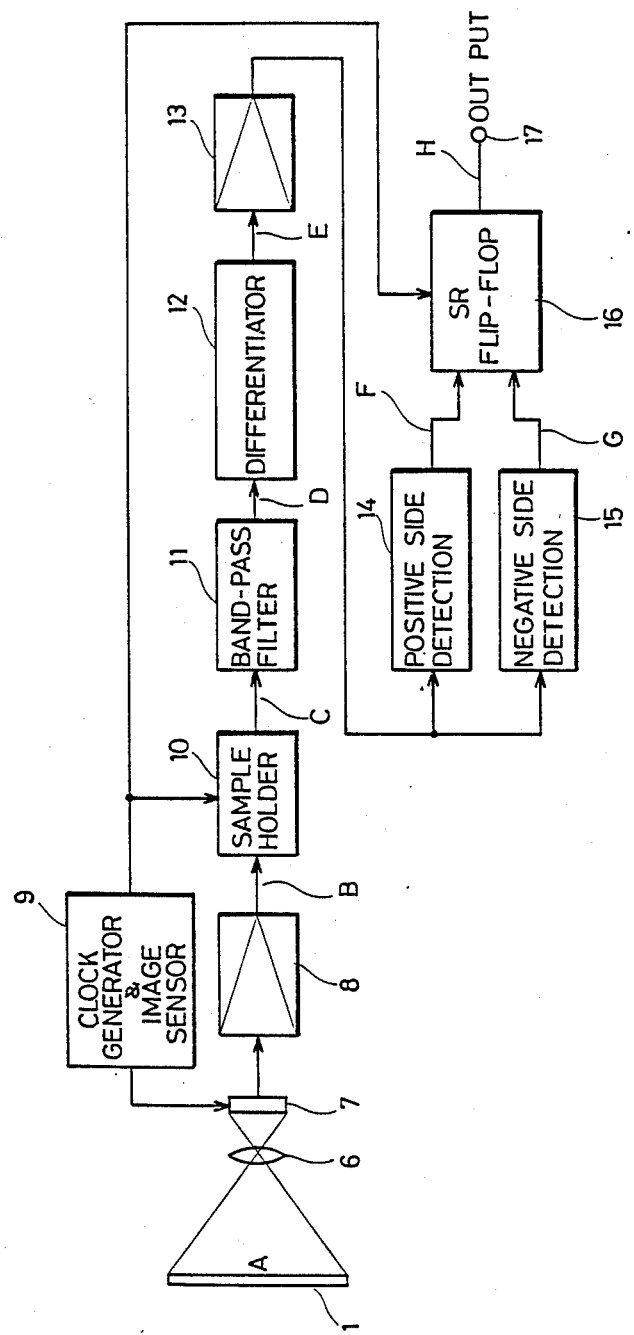
FIG. 2 is a circuit diagram of a time mark reader built into the facsimile equipment of this invention.

The mark reader is described below by referring to the simplified circuit diagram and signal waveform in FIG. 2 and FIG. 3 respectively. In FIG. 2, numeral 1 is the mark sheet, 6 is a lens, 7 is an image sensor, 8 is a preamplifier, 9 is a clock generator and image sensor driver, 10 is a sample holder, 11 is a band-pass filter, 12 is a differentiator, 13 is an amplifier, 14 is a positive side detection Schmidt device, 15 is a negative side detection Schmidt device, 16 is an SR flip-flop, and 17 is an output terminal.

Figure 3:
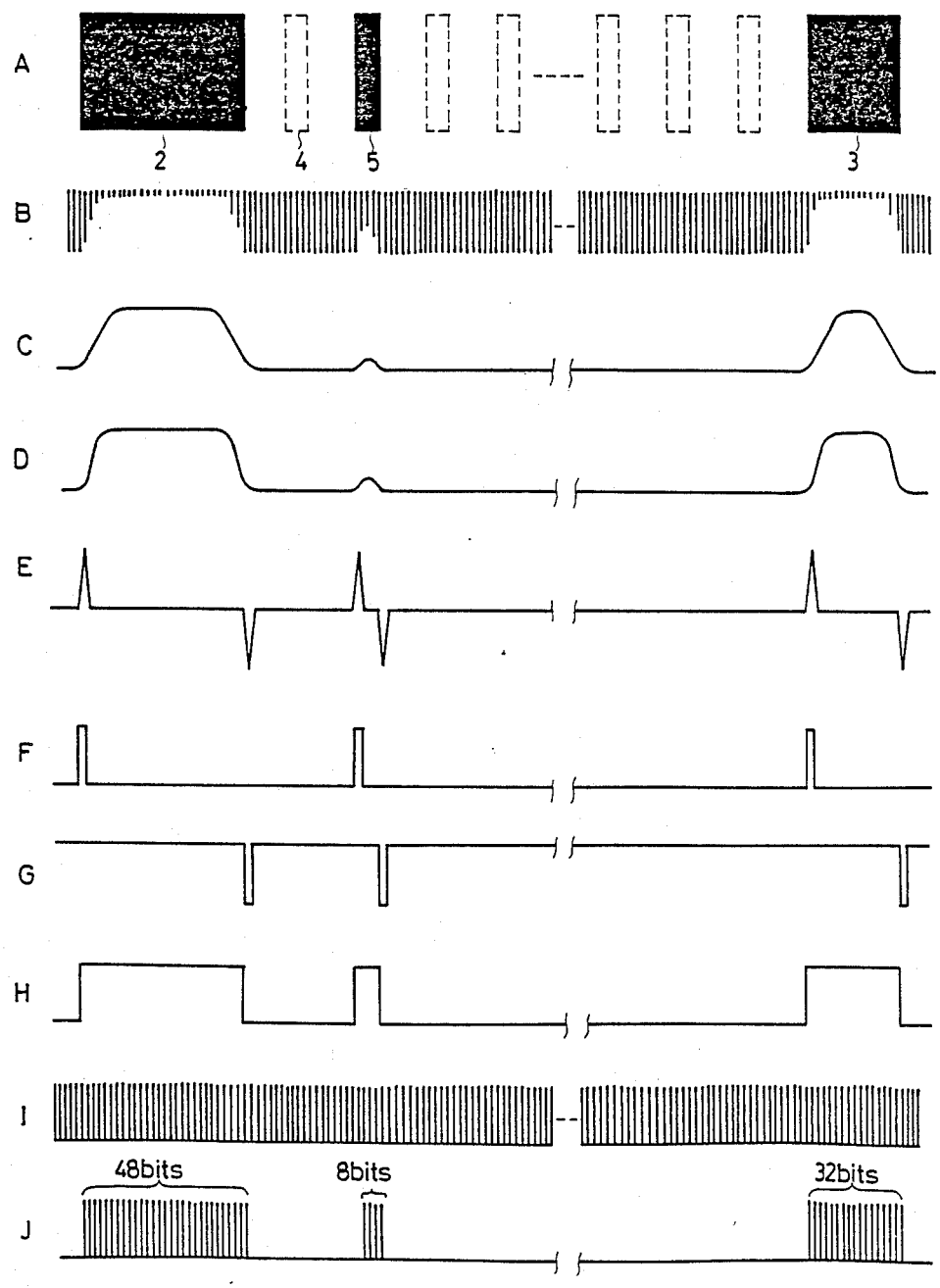
FIG. 3 is a signal waveform diagram showing outputs from individual circuits.

In FIG. 3, A denotes the time mark on the mark sheet 1, B shows an output waveform of the preamplifier 8 obtained by amplifying the output from the image sensor 7, C is an output waveform of sample holder 10, D is an output waveform of band-pass filter 11, E is an output waveform of differentiator 12 and amplifier 13, F is an output waveform of the Schmidt device 14 for slicing the positive side of waveform E, G is an output waveform of the Schmidt device 15 for slicing the negative side of waveform F, and H is an output waveform of SR flip-flop 16. In the diagram, the output of the image sensor 7 is amplified by the preamplifier 8 in response to by the clock signal from the clock generator 9, a sample is held in the sample holder 10, and waveform C is delivered. The output of the sample holder 10 has its noise components eliminated in the band-pass filter 11, output D is obtained, and waveform E is delivered from the differentiator 12. This output is amplified by the amplifier 13, and positive and negative signals are taken out from the positive side detection Schmidt device 14 and negative side detection Schmidt device 15, respectively, and waveform H is obtained by feeding them into the SR flip-flop 16. Thus obtained waveform H is supplied into the time detection device which is described below, as the time mark information written in the card.

Figure 4:
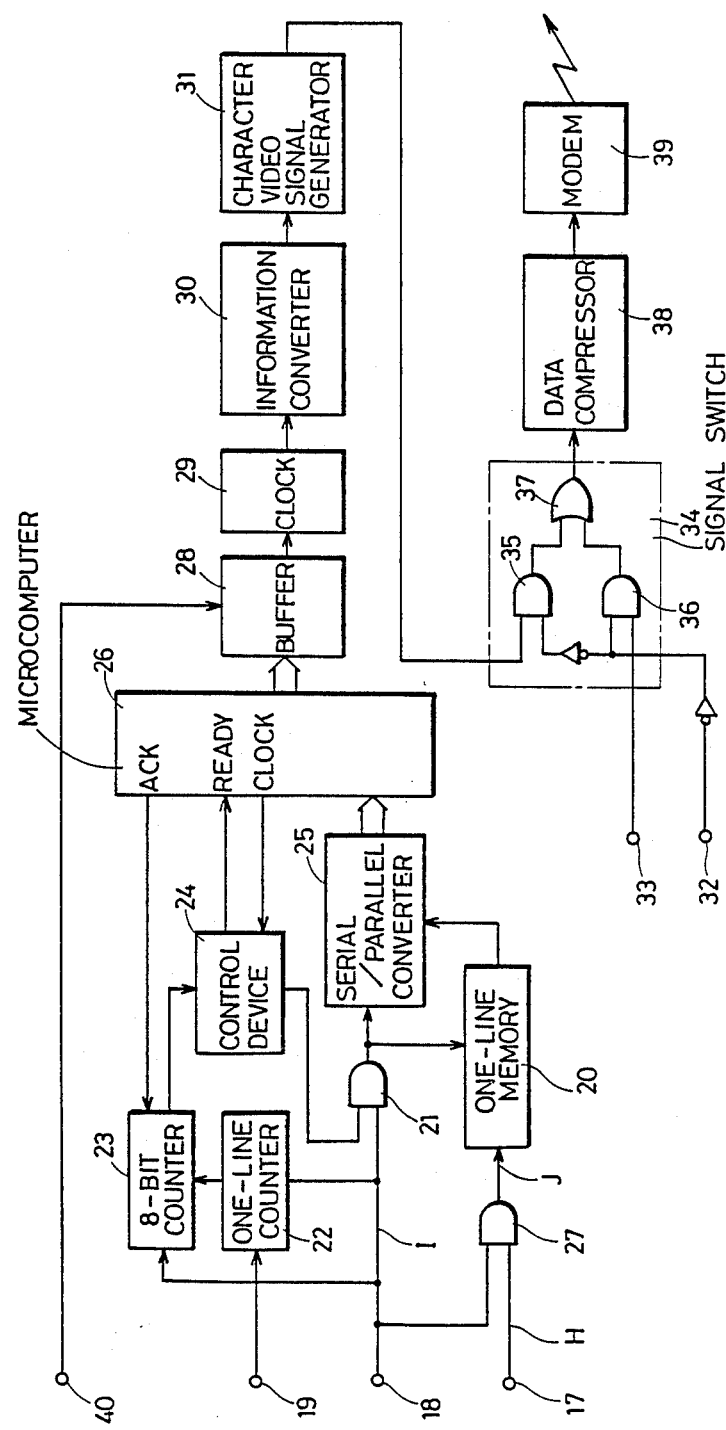
FIG. 4 is a circuit diagram of a time detection device built into the facsimile equipment of this invention.

The operation of the time detection device is described below referring to FIG. 4. First, when the time mark reading instruction signal 2 enters the mark reader, an enable signal is fed into a one-line counter 22 by way of an input terminal 19. This one-line counter 22 counts clock pulses being fed through the input terminal 18 such as waveform I in FIG. 3 from the rise point of the enable signal, to a specified one-line count, and when reaching the specified count, a one-line end signal is delivered to an 8-bit counter 23. Incidentally, until said one-line counter 22 delivers the one-line end signal, the mark information (H in FIG. 3) delivered from said mark reader is supplied into one input terminal of AND circuit 27 through an input terminal 17, while by means of the clock pulse (I in FIG. 3) supplied into the other input terminal, sampling mark information (J in FIG. 3)

is fed into a one-line memory 20 from the output terminal of AND gate 27.

The 8-bit counter 23 counts the clock pulses fed from the input terminal 18 after the one-line end signal has been input from the one-line counter 22, and delivers signals to a control device 24 until reaching the specified count number of the 8. The control device 24 feeds this signal into one of the input terminals of AND circuit 21. A clock pulse is input to the other input terminal of AND circuit 21, and only when the signal supplied from the control device 24 is of high level, a clock pulse is delivered. This clock pulse is fed into one-line memory 20 and a serial/parallel converter 25.

The one-line memory 20, receiving said clock pulse, feeds the mark information for an 8-bit data portion into the serial/parallel converter 25. The serial/parallel converter 25 feeds mark information bitwise (for the portion of 8 bits in total) in synchronism with the clock pulse delivered from the AND circuit 21, and when the input of 8-bit mark information is completed, the serial mark information of 8 bits is delivered parallel. The control device 24 delivers ready signal in synchronism with the falling of the output signal from the 8-bit counter 23.

In synchronism with this ready signal, a microcomputer 26 reads an 8-bit parallel mark signal from the serial/parallel converter 25, and judges if this information is black information or white information, and also counts the number of bits. After this judgment, an ACK signal is delivered to the 8-bit counter 23.

The 8-bit counter 23, upon receiving the ACK signal, again begins to count the clock pulses supplied from the input terminal 18, and feeds signals into the control device 24 until counting 8, and the mark information is judged by the same processing as stated above.

This judging method is explained by referring to FIG. 3 (A). The start mark, space area, time mark entry column, and end mark are set as follows. That is, the start mark is 48 bits long, the space area is 16 bits, the time mark entry column is 8 bits, and the end mark is 32 bits. Therefore, the microcomputer 26 judges a start mark when black information of 48 consecutive bits is fed from the serial/parallel converter 25. When the start mark is detected, the microcomputer 26 delivers an ACK signal without discriminating the space portion (a 16-bit white signal, which means that ready signals were delivered twice from the control device 24). Later, when the fifth ready signal is entered, the 8-bit mark information corresponding to the mark entry column delivered from the serial/parallel converter is read, and is judged in the same manner. Thereafter, similarly, by judging the 8-bit mark information, it is held as one-line mark information by detection of the 32 bits of the end mark. This operation is repeated for the portion of the mark information entry area (for example, 20 lines) in the sub-scanning direction, and it is checked whether 20 lines of data are matched or not. If matched, it is understood that the time mark has been written in the time mark entry column, and the time information corresponding to the filled column is supplied into a buffer 28, and this time information is held temporarily. Thus, the first time information (the year information) is read. Similarly, the other time information items (month, date, day of the week, hour, minute) are read, and the time information corresponding to the filled columns is supplied into the buffer 28 to be held temporarily. The buffer 28 supplies the held time information into a clock device 29, according to a registration instruction signal (supplied from an input terminal 40) entered by the operator. This clock device 29 is composed of a crystal oscillator circuit and a frequency divider circuit, and it always possesses the information of the year, month, date, day of the week, hour and minute.

This time information is upon reception or transmission, fed into an information converter 30, and is converted into a character pattern of, for example, "1985, October 22, Tuesday, 12:36," and this pattern is scanned linearly and separated, and is delivered as video signals of 1 bit each to be supplied into a character video signal generator 31. The video signal delivered from the character video signal generator is fed into the input terminal of an AND circuit 35 of signal switching device 34. This AND circuit 35 is opened by the rise of the time input signal (the signal supplied from the input terminal 32) which is supplied into the other input terminal, and said video signal is fed into a data compressor 38 by way of an OR circuit 37, and after a compressing process, the signal is sent out through a modem 39.

Then, at a specified timing, when the time input signal falls, the AND circuit 35 is closed, and an AND circuit 36 is opened instead. A picture signal (the signal supplied through input terminal 33) is fed into the input terminal of AND circuit 36, and when the AND circuit 36 is opened as stated above, the picture signal enters the data compressor 38 to be compressed, and the processed signal is sent out through the modem 39. Thus, in this embodiment, the code is separated in the circuit configuration described herein, but it is also possible, in other embodiments, to separate in the software.

It is further understood by those skilled in the art that the foregoing description is a preferred embodiment of the disclosed device and that various changes and modifications may be made in the invention without departing from the spirit and scope thereof.

What is claimed is:

1. Apparatus for reading time information into an internal clock of a facsimile system, comprising:
    means for sampling time mark data on a time mark sheet fed into an image reader of said facsimile system;
    means for converting said sampled time mark data into said time information; and
    means for setting said internal clock of said facsimile system with the time information produced by said means for converting.

2. The apparatus defined in claim 1, wherein said time mark data represents the year, month, day of the month, day of the week, hour and minute.

3. The apparatus defined in claim 2, wherein said means for sampling includes means for generating clock pulses, means for scanning the time mark data in synchronism with said clock pulses, and means for producing output signals corresponding to the sampled time mark data.

4. The apparatus defined in claim 3, wherein said means for converting comprises means for counting said output signals according to a predetermined format and producing said time information in accordance with output signals counted during a specific interval.

5. The apparatus defined in claim 4, wherein said means for counting comprises a microcomputer.

6. The apparatus defined in claim 1, further comprising means for generating character data representing the time information set in said internal clock.

* * * * *